UNITED STATES PATENT OFFICE.

CARL T. FULLER, OF EAST ORANGE, NEW JERSEY, ASSIGNOR TO GENERAL ELECTRIC COMPANY, A CORPORATION OF NEW YORK.

WORKING TUNGSTEN.

1,077,696. Specification of Letters Patent. Patented Nov. 4, 1913.

No Drawing. Application filed March 29, 1912. Serial No. 687,228.

*To all whom it may concern:*

Be it known that I, CARL T. FULLER, a citizen of the United States, residing at East Orange, county of Essex, State of New Jersey, have invented certain new and useful Improvements in Working Tungsten, of which the following is a specification.

The present invention relates to the working of metallic tungsten and similar metals. It has been found, for example, that a tungsten body such as a rod or wire, while being swaged, drawn or otherwise worked the same being done ordinarily at or about a red heat, sometimes becomes too brittle or "short" to be manipulated.

In accordance with my invention the rod or wire is rendered susceptible to further working by removing the skin or surface portion in any suitable manner. The swaging or drawing may then proceed. The surface may be removed either chemically or mechanically. For example, the rod or wire may be dipped into or passed through a fusion of an oxidizing salt, such as fused potassium nitrite, $KNO_2$, potassium nitrate $KNO_3$, sodium carbonate $Na_2CO_3$ or barium chlorid. The length of time of the treatment will depend upon the condition of the tungsten rod, ordinarily a few seconds' immersion in the fused salt is sufficient. According to another method the outer layers of the metal are removed by making the tungsten body the anode in a suitable electrolyte such as a 30% solution of potassium hydroxid, the cathode consisting of copper. The current strength, of course, may be regulated to remove the metal rapidly. The metal may also be removed mechanically as by grinding off the hard layer with an emery wheel. After removing the outer layer or surface of metal by any of these methods the drawing, swaging, or other working process is continued.

What I claim as new and desire to secure by Letters Patent of the United States, is:—

1. The process of working metal which has become brittle during drawing or other working which consists in removing the outer surface or skin of metal and then proceeding with the drawing or working.

2. The process of rendering tungsten, which has become brittle during working, susceptible to further working which consists in removing an outer layer of metal.

In witness whereof, I have hereunto set my hand this 25th day of March, 1912.

CARL T. FULLER.

Witnesses:
S. N. WHITEHEAD,
J. H. ELKINS.